United States Patent
Crouch et al.

(10) Patent No.: US 11,108,429 B1
(45) Date of Patent: Aug. 31, 2021

(54) COVERT ACOUSTIC COMMUNICATIONS THROUGH SOLID PROPAGATION CHANNELS USING SPREAD SPECTRUM CODING AND ADAPTIVE CHANNEL PRE-DISTORTION

(71) Applicant: Raytheon Company, Waltham, MA (US)

(72) Inventors: David D. Crouch, Eastvale, CA (US); James J. Richardson, Temecula, CA (US); Walter M. Golonka, Diamond Bar, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/889,302

(22) Filed: Jun. 1, 2020

(51) Int. Cl.
*H04B 1/7097* (2011.01)
*H04L 25/02* (2006.01)
(Continued)

(52) U.S. Cl.
CPC .......... *H04B 1/7097* (2013.01); *G06F 21/55* (2013.01); *H04B 11/00* (2013.01);
(Continued)

(58) Field of Classification Search
None
See application file for complete search history.

(56) References Cited

U.S. PATENT DOCUMENTS 5,559,757 A * 9/1996 Catipovic .............. H04B 11/00
367/134
7,460,605 B2 * 12/2008 Candy .................. H04B 7/0615
375/259

(Continued)

FOREIGN PATENT DOCUMENTS

CN 109347568 A * 2/2019 ............. H04B 11/00
WO WO-9413571 A1 * 6/1994 ............. B65H 75/10

OTHER PUBLICATIONS

Yin et al, Burst mode hybrid spread spectrum technology for covert acoustic communication, IEEE, 2013.*

*Primary Examiner* — Berhanu Tadese
(74) *Attorney, Agent, or Firm* — Schwegman Lundberg & Woessner, P.A.

(57) ABSTRACT

Covert acoustic communications (CAC) through solid propagation channels that connect node pairs is achieved by encoding signals using spread spectrum coding techniques that position the encoded signal at a center frequency $f_c$ within a narrow frequency bandwidth $BW_{NB}$ in which the amplitude of the channel response H(f) between each node pair is relatively high. The channel response H(f), bandwidth $BW_{NB}$ and center frequency $f_c$, and accordingly the signal data rate will adapt for each node pair and possibly each side of the node pair. A pre-distortion filter 1/H(f) pre-distorts the encoded signal over bandwidth $BW_{NB}$ to compensate for material and modal dispersion and multipath between the node pair. This technique avoids the problems associated with frequency dependent attenuation of the continuous solid path and allows for simultaneous transmission and reception of signals among the multiple node pairs.

19 Claims, 13 Drawing Sheets

(51) Int. Cl.
*G06F 21/55* (2013.01)
*H04L 29/06* (2006.01)
*H04B 11/00* (2006.01)

(52) U.S. Cl.
CPC .......... *H04L 25/0212* (2013.01); *H04L 63/18* (2013.01); *G06F 2221/034* (2013.01)

(56) References Cited

U.S. PATENT DOCUMENTS

| | | | |
|---|---|---|---|
| 8,315,326 B2 * | 11/2012 | Agee | H04L 5/0044 375/267 |
| 8,761,274 B2 * | 6/2014 | Lopez de Victoria | H04L 25/0224 375/260 |
| 8,897,353 B2 * | 11/2014 | Thompson | H04L 27/2695 375/232 |
| 9,413,571 B2 * | 8/2016 | Jin | H04L 25/4902 |
| 9,762,414 B2 * | 9/2017 | Lopez de Victoria | H04L 25/025 |
| 9,837,064 B1 * | 12/2017 | Hvidsten | H04R 3/04 |
| 9,887,864 B1 * | 2/2018 | Han | H04L 25/0204 |
| 9,900,794 B2 * | 2/2018 | Han | H04L 43/12 |
| 10,327,213 B1 * | 6/2019 | Han | H04W 52/367 |
| 10,944,751 B2 * | 3/2021 | Brown | G06F 21/602 |
| 2003/0022651 A1 * | 1/2003 | Bannasch | H04L 1/04 455/307 |
| 2004/0095907 A1 * | 5/2004 | Agee | H04B 7/0417 370/334 |
| 2008/0112885 A1 * | 5/2008 | Okunev | A61B 5/0022 424/9.1 |
| 2008/0198695 A1 * | 8/2008 | Abdi | H04B 11/00 367/134 |
| 2011/0128822 A1 * | 6/2011 | Davies | G01S 3/8083 367/131 |
| 2013/0172662 A1 * | 7/2013 | Menzl | H04R 25/606 600/25 |
| 2013/0208768 A1 * | 8/2013 | Song | H04B 11/00 375/218 |
| 2014/0076224 A1 * | 3/2014 | Smith | B63B 59/06 114/222 |
| 2014/0206367 A1 * | 7/2014 | Agee | H04W 28/0236 455/450 |
| 2014/0269201 A1 * | 9/2014 | Liu | H04B 11/00 367/131 |
| 2016/0034305 A1 * | 2/2016 | Shear | G06F 16/248 707/722 |
| 2016/0050030 A1 * | 2/2016 | Riedl | G08C 23/02 367/133 |
| 2018/0252796 A1 * | 9/2018 | Qu | H04R 1/40 |
| 2018/0262278 A1 * | 9/2018 | Heifetz | H04B 7/15528 |
| 2020/0322377 A1 * | 10/2020 | Lakhdhar | G06F 17/18 |

* cited by examiner

10 ACOUSTIC TRANSCEIVER
12 BUILDING
14 WALLS
15 ROOMS
16 SOLID PATHS
18 HANDSET
20 COMPUTER

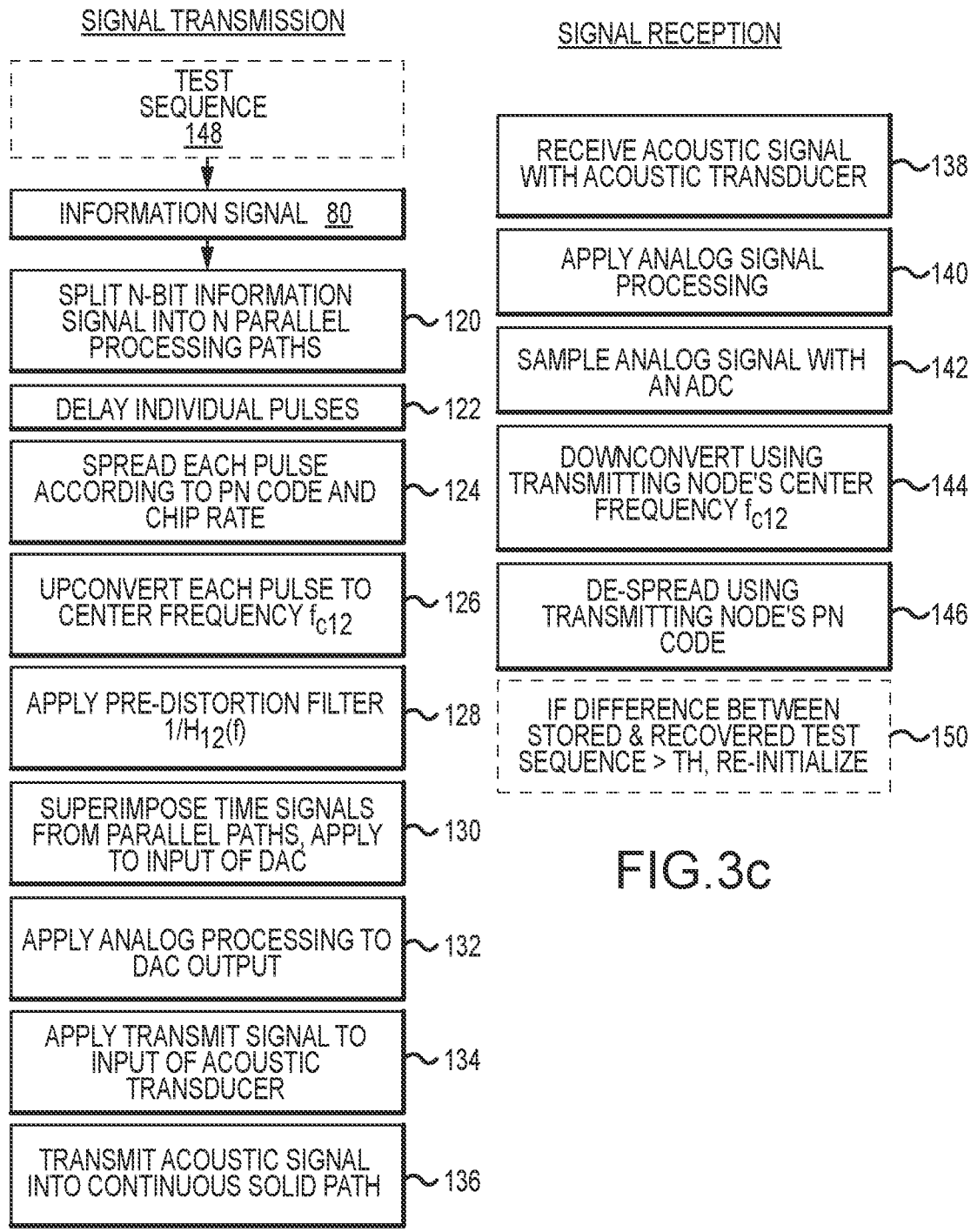

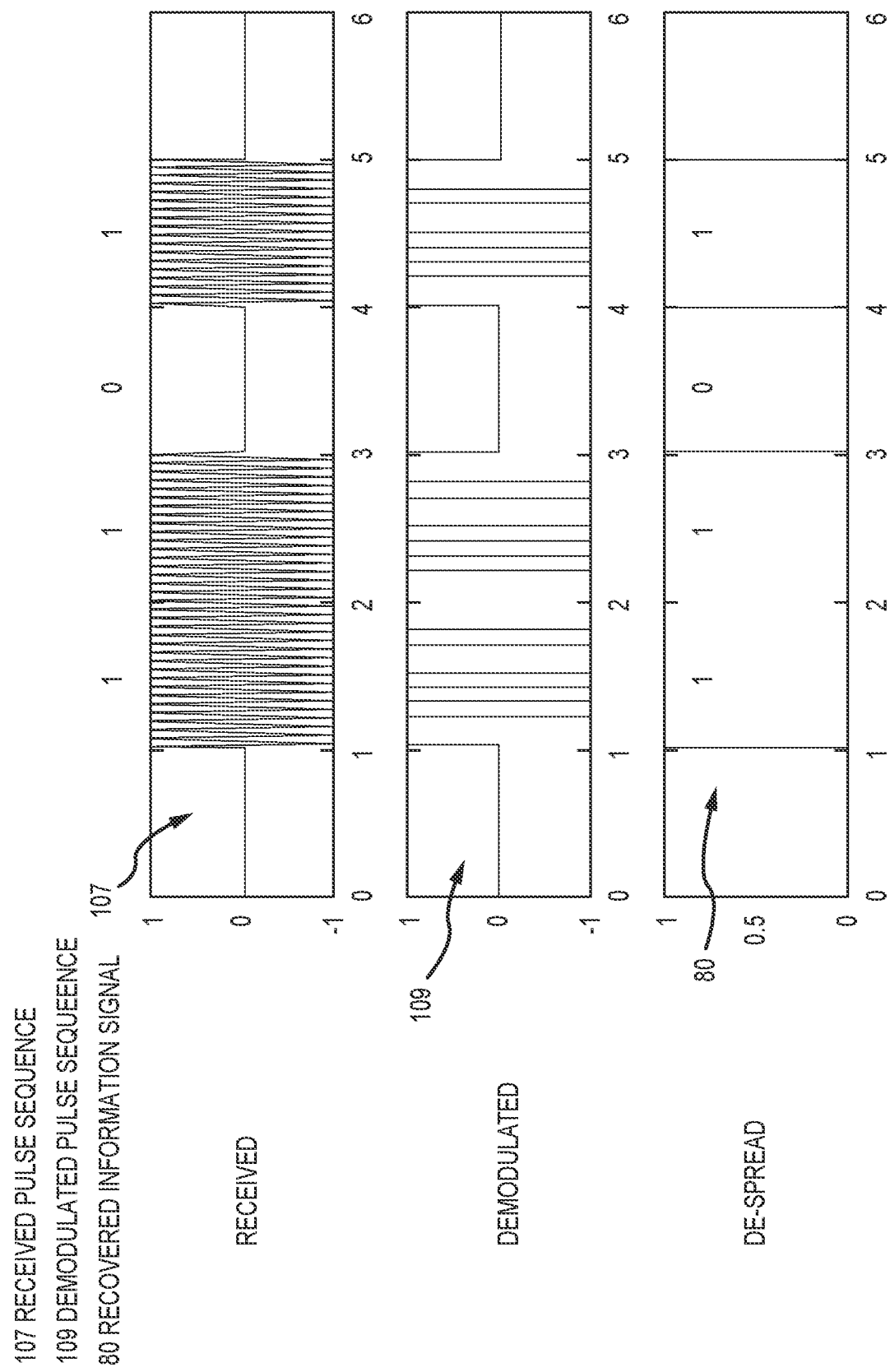

COVERT ACOUSTIC COMMUNICATIONS THROUGH SOLID PROPAGATION CHANNELS USING SPREAD SPECTRUM CODING AND ADAPTIVE CHANNEL PRE-DISTORTION

BACKGROUND OF THE INVENTION

Field of the Invention

This invention relates to covert acoustic communications through solid propagation channels, and more particularly to the use of spread spectrum codes adaptively positioned in high amplitude regions of the channel response and adaptive channel pre-distortion.

Description of the Related Art

To communicate information, information bearing signals are modulated and excited from a transmitter, the excitation signals propagate through a physical channel such as a wire, cable, optic fiber or air, and are received by a receiver where the signals are demodulated and the information is recovered. In certain real-life applications, conventional communications schemes may be physically impractical, denied or compromised. For example, the losses or shielding in certain industrial applications make radio frequency (RF) communications impossible. In other law enforcement, military or secure cyber applications, the RF communications may be denied or compromised.

In these types of applications, acoustic communications in which the excitation signals (referred to as "elastic signals") lie in the acoustic band propagate through a physical channel that is a continuous solid path between the transmitter and the receiver. The "continuous solid path" could be a single structural element such as a pipe or wall of a building that connects to nodes in the communication network. Alternately, the path could be a plurality of different structural elements that maintain physical contact from the transmitter to the receiver with no air gaps. In most applications, it is impractical to accurately characterize the channel response with a model or closed form solution. The path is lossy and that loss is frequency dependent.

The available bandwidth to support communications via elastic signals is far less than the bandwidth that is supported by traditional radio-frequency channels' kilohertz (kHz) versus gigahertz (GHz). Therefore, acoustic communication is typically only used when more traditional methods are not available and limited to command and control messages and limited amounts of data.

One advantage of acoustic communications through a physical channel is that it is, to some extent, inherently secure and covert. A third party would have to know acoustic communications was being employed and have an acoustic receiver physically present at one of the nodes. The channel response between any pair of nodes is highly dependent on the continuous solid path and thus serves to provide a level of encryption in any communication between the nodes.

The "continuous solid path" that connects nodes in an acoustic communications network is a dispersive multi-modal medium in which multi-path for the elastic signals is prevalent. The path exhibits frequency dependent attenuation, signal corrupting noise, and the distortion effects caused by effects of echoes and reverberation or multipath. Multipath can create destructive interference resulting in a loss of received power in a very localized area referred to as "fading." Multipath can further reduce effectiveness by increasing intersymbol interference (ISI). These problems are exacerbated by the frequency dependent attenuation of the path. The path is assumed to be "reciprocal", which among other things means that the response of a channel between two points is the same in both directions.

To address these limitations, time reversal signal processing (TRSP) is one approach used to communicate in an acoustic communications network. TRSP compensates for material and modal dispersion and multipath without need for prior knowledge of the channel characteristics and reverses or undoes the effects of multipath on the signals. Time reversal is made possible by time-reversal invariance, which is a property of the wave equation in the absence of losses. For the wave equation in the absence of losses, the time-reversed version of a solution is also a solution. Losses break time-reversal invariance.

In TRSP a destination node transmits a broadband probe signal to the source node. The received probe signal is time-reversed, used to modulate an information signal and transmitted back to the destination node where it is received and demodulated to extract the information signal. U.S. Pat. Nos. 7,460,605 and 9,413,571 disclose different techniques for time reversal signal processing for acoustic communications.

Although TRSP is built on the assumption that the channel is not lossy, if the attenuation is constant with frequency, a time reversed probe signal will be attenuated but undistorted when it reaches the destination node. If there is significant variation in attenuation with frequency, if there are high-loss "holes" in the channel response, the corresponding frequencies will be nearly absent at the receiver and as a result the received probe signal may be significantly distorted compared to the transmitted probe signal.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for covert acoustic communications (CAC) over continuous solid paths that connect node pairs. Information signals are encoded using spread spectrum coding techniques that position the encoded information signal at a center frequency $f_c$ within a narrow frequency bandwidth $BW_{NB}$ in which the amplitude of the channel response H(f) between each node pair is relatively high. The channel response H(f), bandwidth $BW_{NB}$ and center frequency $f_c$, and accordingly the signal data rate will adapt for each node pair and possibly each side of the node pair. A pre-distortion filter 1/H(f) pre-distorts the encoded signal over bandwidth $BW_{NB}$ to compensate for material and modal dispersion and multipath between the node pair. A receiving node demodulates a received time signal R(t) with the center frequency $f_c$ for the transmitting node and despreads the demodulated signal with the spread spectrum code unique to the transmitting node to recover the information signal. This technique avoids the problems associated with frequency dependent attenuation of the continuous solid path connecting a given node pair and allows for simultaneous transmission and reception of signals among the multiple node pairs.

In an embodiment, spread spectrum coding spreads the signal bandwidth by a spreading factor, typically fixed for all node pairs. For a given bandwidth $BW_{NB}$, the node pair selects a maximum signal data rate such that the resulting spread spectrum signal exhibits a bandwidth that is approximately equal to but not greater than bandwidth $BW_{NB}$. The spread spectrum signal is modulated onto the center frequency $f_c$ for the node pair to place the signal within bandwidth $BW_{NB}$. Spread spectrum codes such as direct-sequence spread spectrum (DSSS), frequency-hopping spread spectrum (FHSS), time-hopping spread spectrum (THSS) and chirp spread spectrum (CSS) may be used alone or in combination to spread the signal bandwidth.

In an embodiment, a known test signal is periodically encoded and transmitted between a node pair, or sent in the header of an encoded information signal. The receiving node recovers the test signal and compares it to the stored known test signal. If the difference between the signals exceeds a threshold, the node pair is re-initialized to determine the channel response H(f) and select bandwidth $BW_{NB}$ and center frequency G.

In an embodiment, if a node pair fails to establish a direct communication channel between the two nodes, an indirect communication channel including one or more intermediate nodes may be established. In an embodiment, a transmitting node spreads, pre-distorts and transmits the signal intended for a destination node to an intermediate node with an instruction to spread, pre-distort and transmit to the destination node, and repeats until the signal reaches the destination node. In another embodiment, the channel response H(f), $BW_{NB}$ and $f_c$ for each pair of nodes is transmitted to a master node. The master node determines a routing table to connect all of the node pairs either directly or through one or more intermediate nodes and transmits the routing table to each of the nodes.

In an embodiment, each node pair selects bandwidth $BW_{NB}$ based on a metric that weights the width of a bandwidth, the local average amplitude over the bandwidth and a variability of the amplitude over the bandwidth. To the extent supported by the channel response, the node pair wants to select a wide bandwidth with high local average amplitude and a low variability. In a specific embodiment, the node pair finds a peak amplitude in channel response H(f) and grows the bandwidth until the amplitude response falls to, for example, 3 dB from the peak amplitude on either side of the peak. If the bandwidth exceeds a threshold, the bandwidth as $BW_{NB}$ is selected. If not the node pair finds the next high peak amplitude and grows the bandwidth. This can be done for one side or both sides and averaged and used as common parameters for the node pair or each node can compute the metric independently to establish its own parameters.

In an embodiment, each node pair is initialized by transmitting a known channel sounding pulse from one node to the other and vice-versa. The receiving node determines an estimate of its channel response H(f), bandwidth $BW_{NB}$ and center frequency $f_c$ and exchanges its bandwidth $BW_{NB}$ and center frequency $f_c$ with the other node to tell the other node the parameters with which it will be transmitting. This exchange may be done by encoding a known pulse into the bandwidth BNNB using the spread spectrum code and pre-distorting the encoded pulse by 1/H(f) from which the other pulse can extract $f_c$ and $BW_{NB}$. Alternately, these parameters may be exchanged via different channel, not a continuous solid path. The transmitting node uses its estimate of the channel response H(f) and the selected bandwidth $BW_{NB}$ and center frequency $f_c$ to encode, pre-distort and transmit the signal.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a through 3c are a block and flow diagrams of an embodiment of a node-to-node signal chain for encoding and decoding an information signal in an adaptive channel pre-distorted spread spectrum waveform positioned in the low attenuation band of the channel response;

FIGS. 4a and 4b illustrate an embodiment for the step-by-step processing of the information signal for transmission and reception, respectively;

DETAILED DESCRIPTION OF THE INVENTION

Figure 1A:
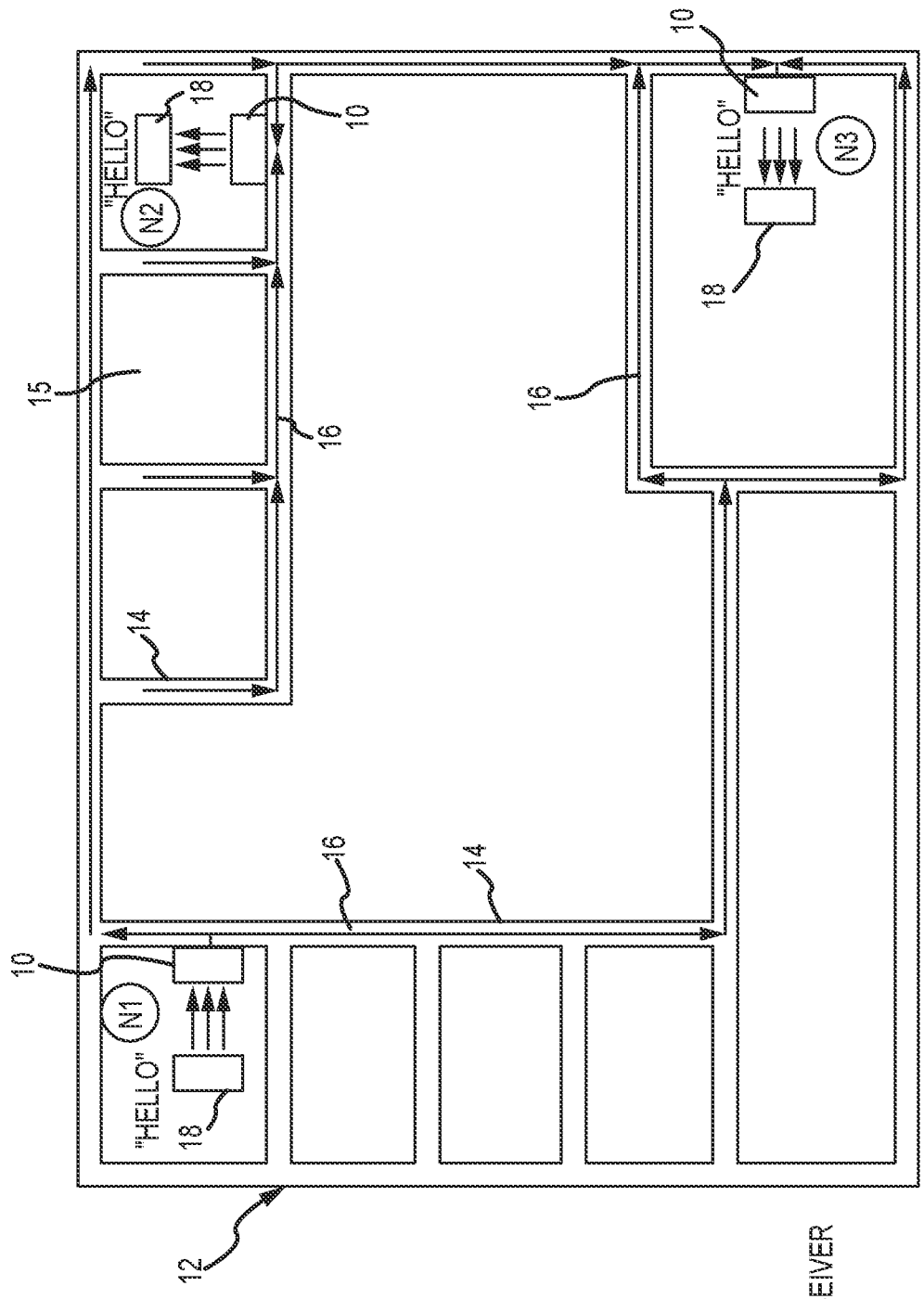
FIGS. 1a and 1b illustrate different applications for covert acoustic communications using spread spectrum codes.

Covert acoustic communications (CAC) over continuous solid paths that connect node pairs is achieved by encoding signals using spread spectrum coding techniques that position the encoded signal at a center frequency $f_c$ within a narrow frequency bandwidth $BW_{NB}$ in which the amplitude of the channel response H(f) between each node pair is relatively high. The channel response H(f), bandwidth $BW_{NB}$ and center frequency $f_c$, and accordingly the signal data rate will adapt for each node pair and possibly each side of the node pair. A pre-distortion filter 1/H(f) pre-distorts the encoded signal over bandwidth $BW_{NB}$ to compensate for material and modal dispersion and multipath between the node pair. This approach discards the ill behaved part of the channel response in each node pair and then constrains the spread spectrum codes to the narrow band well-behaved part of the channel response. This technique avoids the problems associated with frequency dependent attenuation of the continuous solid path and allows for simultaneous transmission and reception of signals among the multiple node airs.

Spread spectrum coding makes use of a sequential noise-like signal structure to spread the normally narrowband information signal over a relative wide band of frequencies. The amount of spread is typically a fixed multiplier, which may be referred to as the "spreading factor". For example, the signal may occupy 20% of the available bandwidth with 80% used for spread spectrum coding. The receiver correlates the received signals to retrieve the original information signal. Spread spectrum codes such as direct-sequence spread spectrum (DSSS), frequency-hopping spread spectrum (FHSS), time-hopping spread spectrum (THSS) and chirp spread spectrum (CSS) may be used alone or in combination to spread the signal bandwidth. DSSS and FHSS use pseudorandom number sequences to determine and control the spreading of the signal across the allocated bandwidth.

With DSSS, the signal to be transmitted and the code or "chip" are multiplied together; the code itself is nothing more than a pseudo-random sequence of 1's and −1's. The "spreading factor" is the length of the sequence for a single information pulse. Each chip has a much shorter duration (larger bandwidth) than the original information bits. The modulation of the information bits scrambles and spreads the pieces of data, and thereby results in a bandwidth size nearly identical to that of the spreading sequence. The smaller the chip duration, the larger the bandwidth of the resulting DSSS signal. At the receive end, when the spread signal is multiplied by the same sequence, so the de-spreading sequence matches up with that used to spread the received signal (1's match up with 1's, −1's match up with −1's) the original signal is recovered. If the wrong code is used, a noise-like signal is recovered. With FHSS, the carrier (or center) frequency hops around randomly inside the available bandwidth. The available band is divided into smaller sub-bands in accordance with the spreading factor. As the spreading factor is typically fixed, the amount of bandwidth in a sub-band available for the information signal scales with the available bandwidth. THSS employs $2k$ discrete pulses to transmit k bit(s) per pulse, where k is the spreading factor. CSS uses wideband linear frequency modulated chirp pulses to encode information where the spreading factor represents the ratio of bandwidth of the chirp pulses to the bandwidth of the information signal.

Figure 1B:
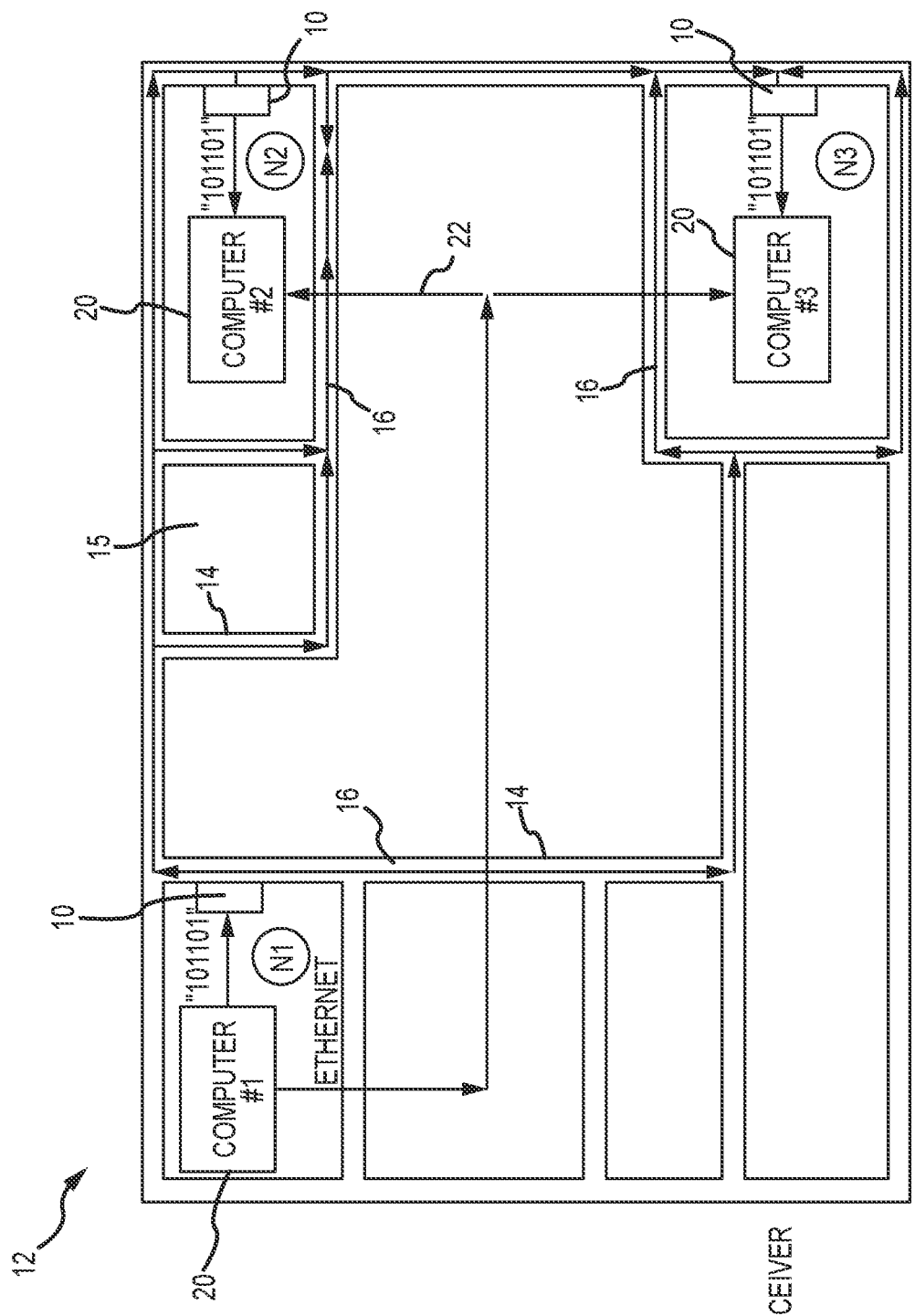

Referring now to FIGS. 1a and 1b that illustrate different applications of covert acoustic communications (CAC) over continuous solid paths that connect multiple nodes N1, N2 and N3 where each node includes an acoustic transceiver 10. In these applications, CAC occurs within a building 12 that has multiple walls 14 that defines rooms 15 of the building. Walls 14 are connected to define multiple continuous solid paths 16 between the different node pairs N1-N2, N1-N3 and N2-N3. More generally a continuous solid path (no air gaps) may include one or more solid elements that are in direct contact to propagate elastic waves e.g., 1 kHz to 5 MHz, from one node to another. Solid elements may include walls, floors, ceilings, beams, pipes or the like and may be formed from concrete, steel, wood or the other solid materials; any continuous combination of solid elements capable of propagating elastic waves. There will be multiple continuous solid paths that connect each node pair, hence the "multi-path" problem. Each transceiver 10 includes a transducer in direct contact with the continuous solid path to covert electrical signals into elastic waves within the solid and vice-versa.

In FIG. 1a, the nodes may correspond to people such as the military or law-enforcement personnel who have a handset 18 coupled to the transceiver. The personnel speak into the handset 18 and the signal is converted to an electrical signal that drives the transducer to produce an elastic wave that is coupled into the walls of the building and propagates in all directions. As will be discussed in detail, the electrical signal is encoded using spread spectrum codes that are adaptively positioned in a narrow band of a channel response H(f) that characterizes the path between the transmitting node and the intended receiving node. The spread spectrum signal is then pre-distorted by 1/H(f) within the narrow band and coupled into the wall. Because the channel response H(f) between any two nodes is unique and each node uses a unique spread spectrum code to transmit, the receiving node, and only the intended receiving node, can recover the original signal. Furthermore, multiple nodes may communicate with each other simultaneously. This allows military or law enforcement personnel to communicate covertly in situations in which other means of communication is either denied or would be detected.

In FIG. 1b, the nodes may correspond to computers 20 that are interconnected via a hard-wired or wireless high-speed network 22. During ordinary operations the computers 20 communicate with each other over the high-speed network 22. However if the network 22 is attacked, penetrated or taken down the computers 20 may need a secondary channel over which they can communicate covertly. The attacker may not even know that the attack has been detected and reported via the secondary channel. CAC provides this channel. Each computer 18 is coupled to one of the transceivers 10 to communicate via the continuous solid paths.

Before the continuous solid paths that connect node pairs can be used for covert acoustic communications, each node pair must be initialized to define a viable channel between the nodes. The parameters of the viable channel adapt based on the material and modal dispersion and multipath of the given continuous solid path between the nodes and will be different for each and every node pair. Initialization essentially includes determining a channel response H(f) for a node pair, selecting a narrow frequency bandwidth $BW_{NB}$ and center frequency $f_c$ in which the amplitude response is relatively high and exchanging the bandwidth $BW_{NB}$ and center frequency $f_c$ within the node pair.

In theory, if the solid media that makes up the continuous solid path is "reciprocal" the channel response H(f) is the same in both directions e.g. $H_{TxRx}=H_{RxTx}$ and the selected narrow frequency bandwidth $BW_{NB}$ and center frequency $f_c$ should also be the same. In some cases, the nodes may be configured to assume a perfectly reciprocal path and use the same channel response, narrowband and center frequency for each side of a node pair. In other cases, the nodes may compute those parameters on each side, exchange the $BW_{NB}$ and center frequency $f_c$ and use them when transmitting to the other node.

Figure 2A:
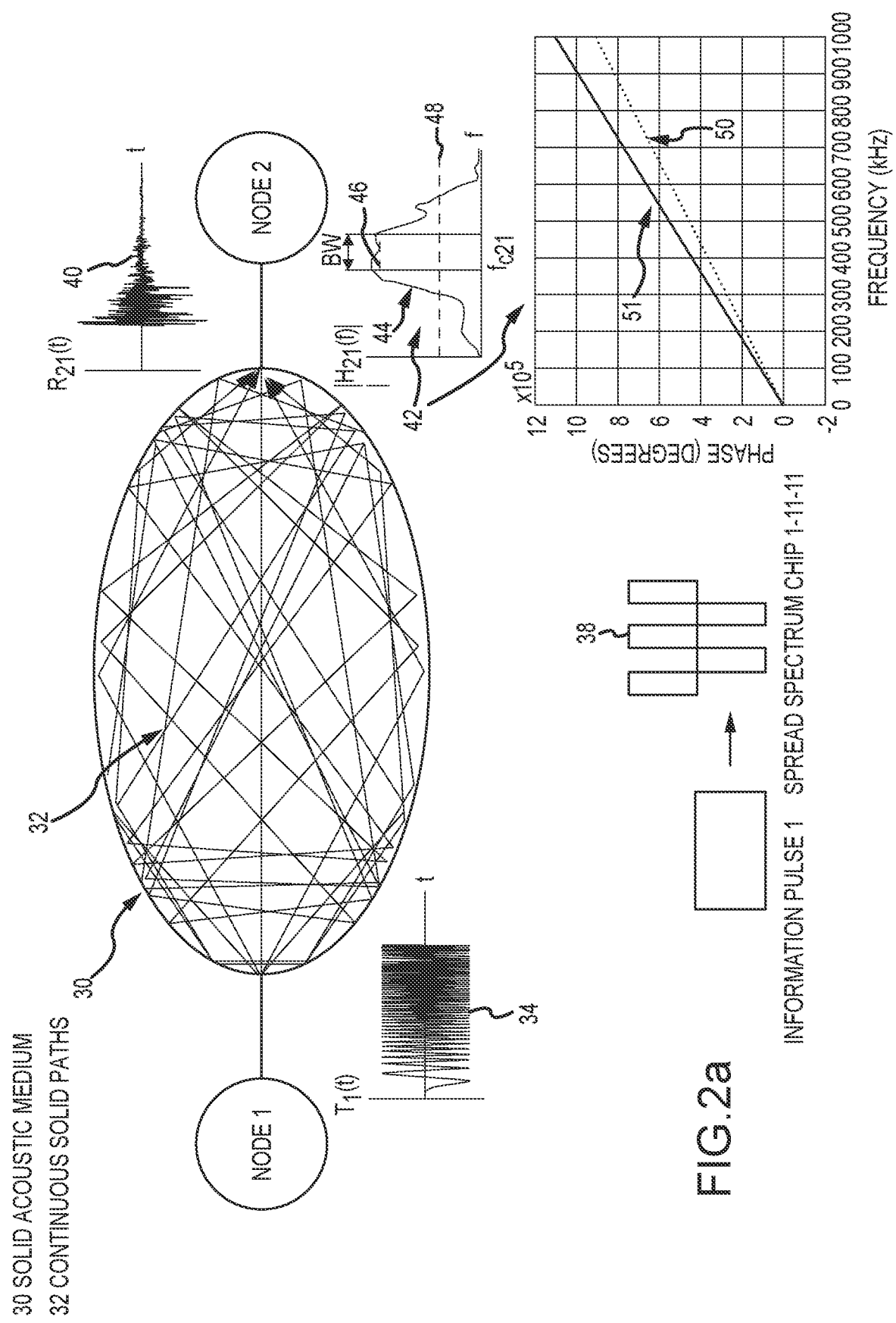
FIGS. 2a and 2b are a visual and flow diagram of an embodiment of channel sounding for characterizing a channel response between nodes N1 and N2, selecting a band of the channel response in which amplitude response is high and positioning the spread spectrum codes within that band.
Figure 2B:
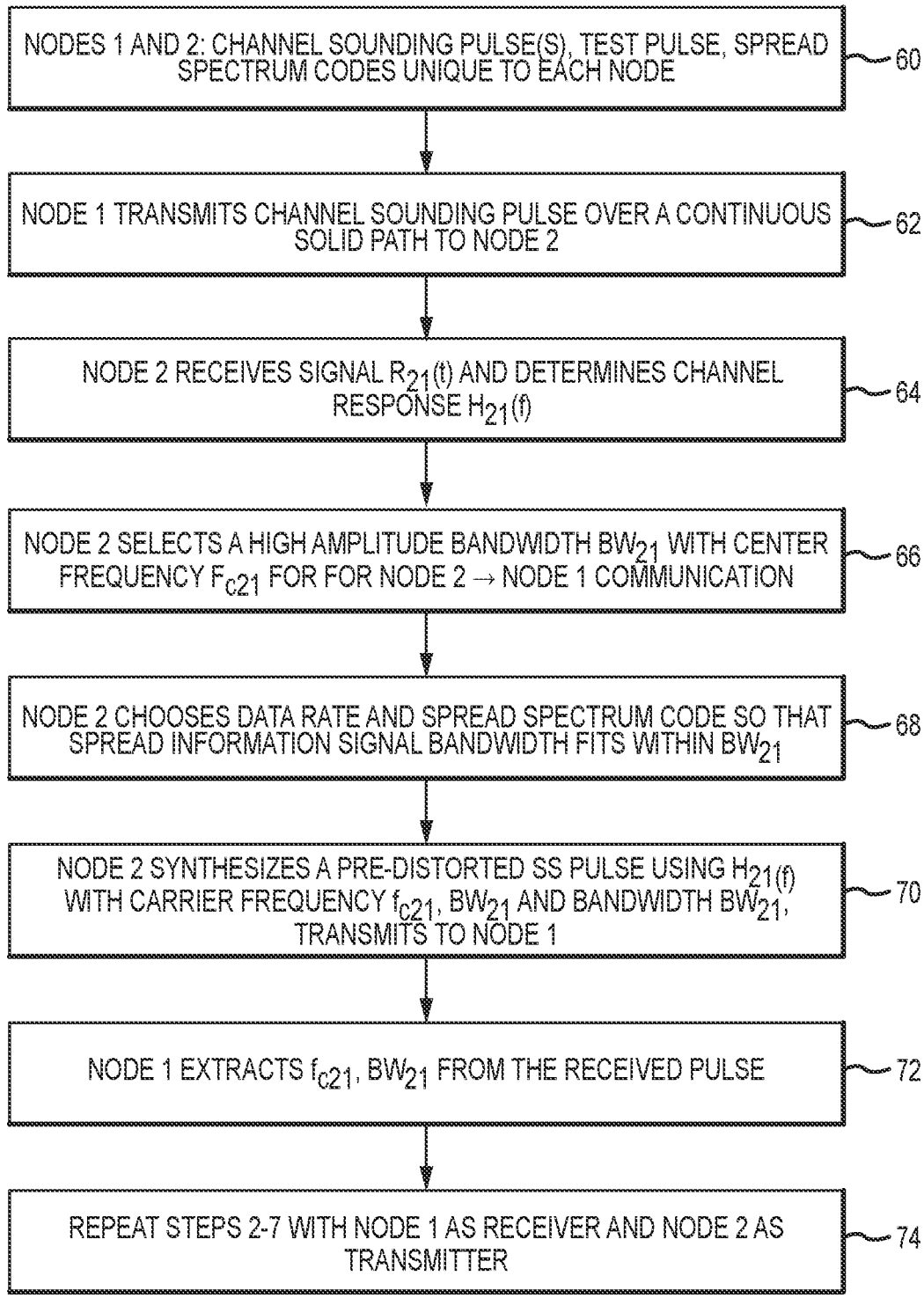
Figure 3A:
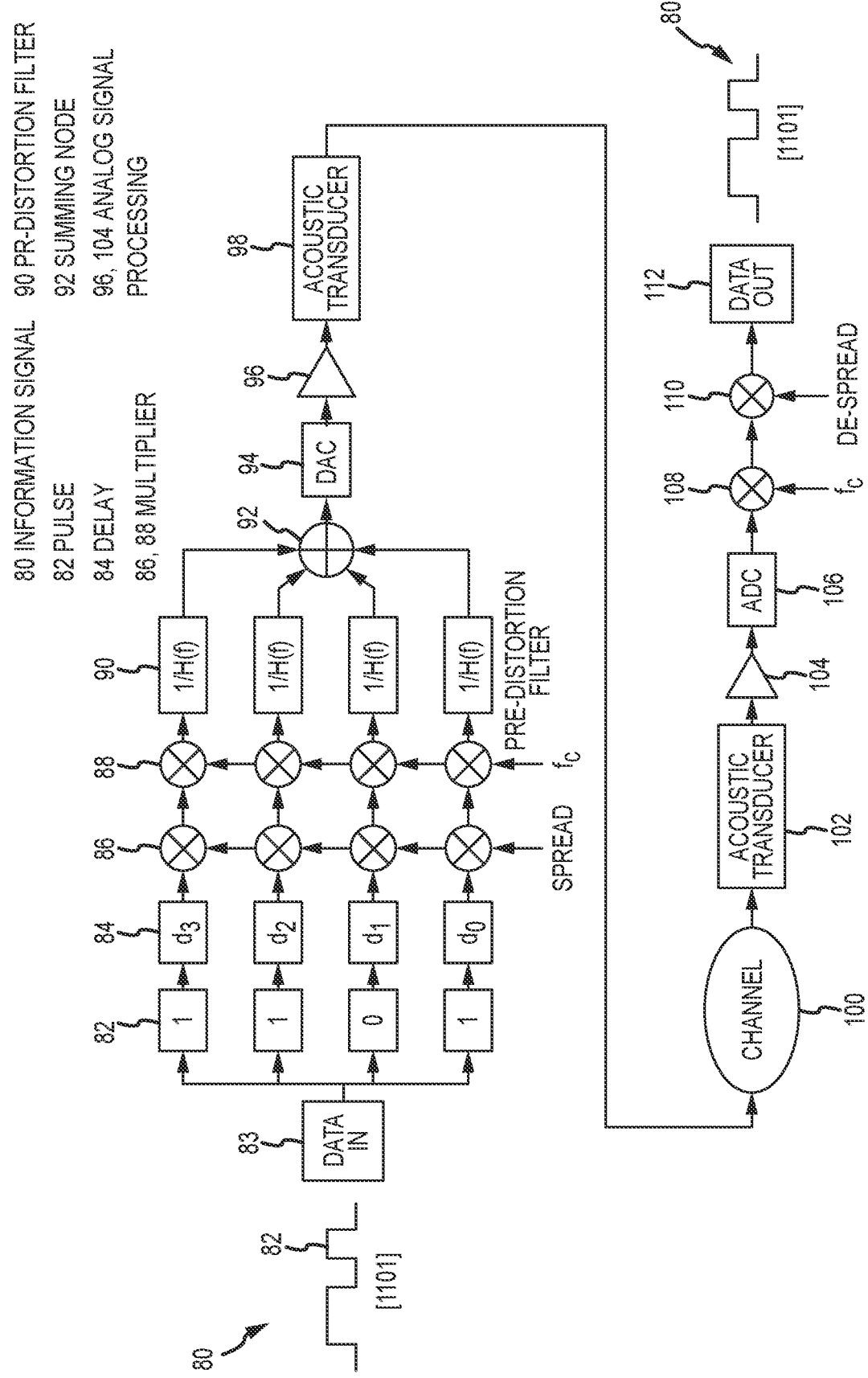
Figure 4A:
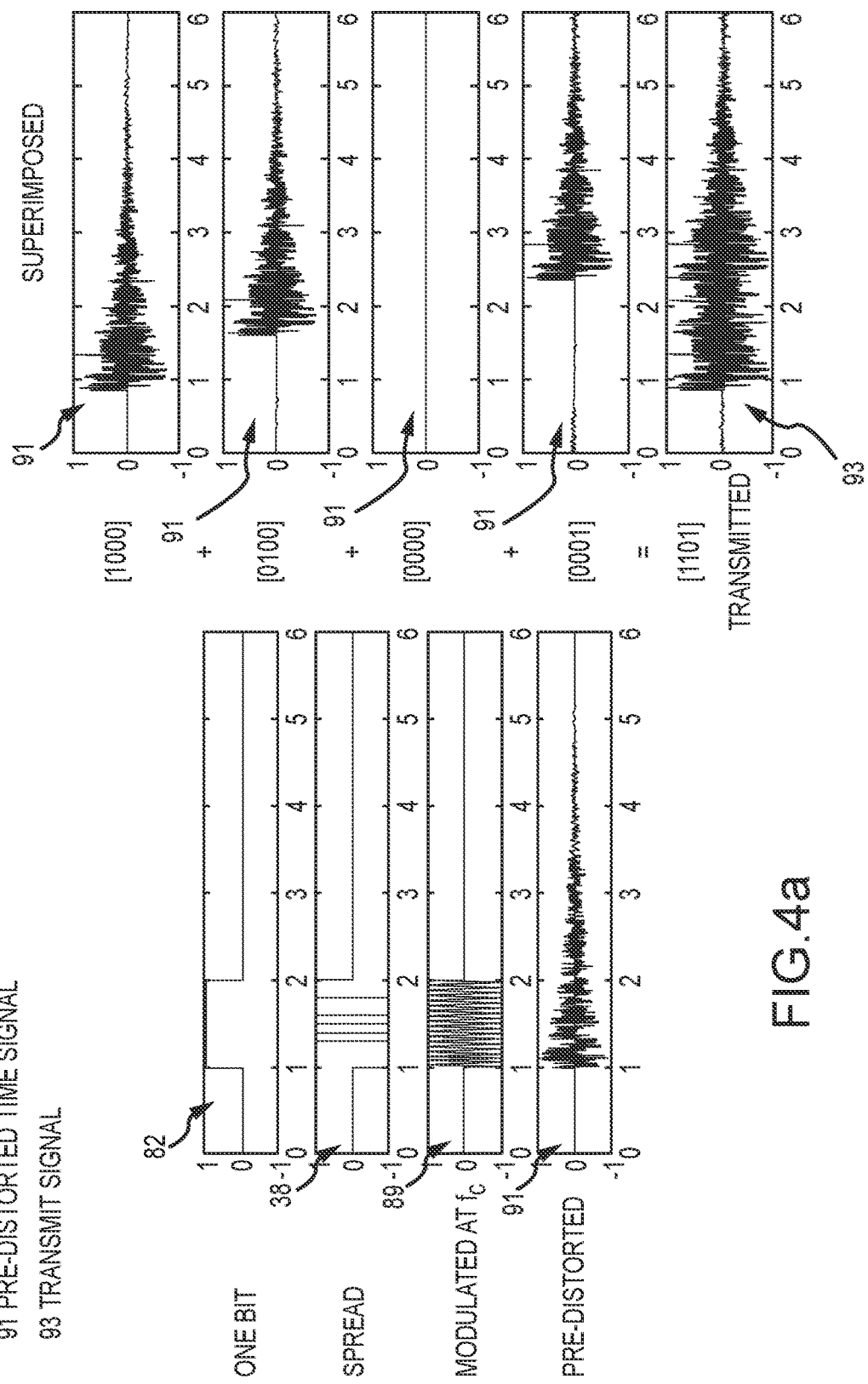

Without loss of generality, an embodiment for initializing a single node pair N1 and N2 in which the channel response H(f) and bandwidth $BW_{NB}$ and center frequency G are determined and selected for each side of the node pair and DSSS is employed is illustrated in FIGS. 2a and 2b. Nodes N1 and N2 are coupled by a solid acoustic medium 30 comprising a plurality of continuous solid paths 32 along which elastic waves may propagate between the nodes. Each node is provided with a common channel sounding pulse 34, a common test pulse e.g. a Gaussian pulse, and a spread spectrum code 38 unique to that node (step 60). The channel sounding pulse is broadband, typically wide enough to cover 1 kHz to 1 MHz and possibly up to 5 MHz. The width of the test pulse can be varied to match its bandwidth to the selected band of the channel response.

Initialization commences with Node N1 transmitting the broadband channel sounding pulse $T_1(t)$ 34 into solid acoustic medium 30 where the pulse propagates as elastic waves along, and distorted by, the multiple continuous solid paths 32 where it arrives at Node N2 as a time-limited signal $R_{21}(t)$ 40 (step 62). Node 2 receives signal $R_{21}(t)$ and determines a broadband channel response $H_{21}(f)$ 42 as the ratio of the frequency spectrum of signal $R_{21}(t)$ to the frequency spectrum of channel sounding pulse $T_1(t)$ (step 64).

Node 2 then selects a narrow bandwidth $BW_{21}$ (or more generically $BW_{NB}$) with center frequency $f_{c21}$ over which the amplitude 44 of channel response channel response $H_{21}(f)$ 42 is relatively high for transmission from Node 2 to Node 1 (step 66). A "relatively high" amplitude means that at least a local average amplitude 46 over bandwidth $BW_{21}$ is greater than a global average amplitude 48 over the broadband bandwidth $BW_{WB}$ of the entire channel response. Channel response $H_{21}(f)$ is also characterized by a phase 50 for a direct path of 10 meters between the transmitter and receiver nodes and by a phase 51 and for 100 separate paths with random added path lengths between 0 and 5 meters by way of example.

More specifically, each node pair (or node) selects bandwidth $BW_{NB}$ based on a metric that weights the width of a bandwidth, the local average amplitude over the bandwidth and a variability of the amplitude over the bandwidth. The node pair wants to select a wide bandwidth with high local average amplitude and a low variability. In a specific embodiment, the node pair finds a peak amplitude in channel response H(f) and grows the bandwidth until the amplitude response falls to, for example, 3 dB from the peak amplitude on either side of the peak. If the bandwidth exceeds a threshold, the bandwidth as $BW_{NB}$ is selected. If not the node pair finds the next highest peak amplitude and grows the bandwidth. Many different techniques could be used to satisfy the metric and extract a suitable bandwidth for acoustic communications between the node pair.

Each node must exchange its bandwidth and center frequency with the other node of the node pair. This may be done, as in this embodiment, using the acoustic channel. It is not necessary to exchange the channel response. The 1/H(f) pre-distortion is cancelled by the H(f) channel response as the signal propagates through the solid media. Because of limited bandwidth, the channel response is not exchanged. The node pair assumes that the measured channel responses $H_{12}(f) = H_{21}(f)$ or are close enough in the selected narrow bands. If a separate channel, such as a high bandwidth wired or wireless channel is available during initialization, that channel may be used to exchange the channel response parameters and even the channel response itself.

In this embodiment, Node 2 chooses a signal data rate and the spread spectrum code rate, typically a fixed multiple of the signal data rate, so that the spread information for test pulse, e.g., a Gaussian envelope, fits within band $BW_{21}$ (step 68). Node 2 synthesizes a pre-distorted spread spectrum pulse using the test pulse, channel response $H_{21}(f)$, center frequency $f_{c21}$ and bandwidth $BW_{21}$ and transmits the waveform on solid acoustic medium 30 (step 70). Node 1 receives a time-limited signal and extracts center frequency $f_{c21}$ and bandwidth $BW_{21}$ (step 72). Node 1 stores center frequency $f_{c21}$, and bandwidth $BW_{21}$ for use when receiving an encoded information signal from Node 2.

Because the center frequency $f_{c21}$, bandwidth $BW_{21}$ are extracted or measured from the received time-limited signal, their values may not match the transmitting node's parameter values exactly. For DSSS, the chip rate used to spread and de-spread must match or the pulses, hence recovered information signal will be distorted. In an embodiment, to effectively exchange the chip rate, the chip rate is selected from a set of finite and discrete rates that support a known and fixed spreading factor over a wide range of potential narrow bandwidths $BW_{21}$. On receipt of the time-limited signal, Node 1 approximates the value of the chip rate from the extracted bandwidth $BW_{12}$ and uses that chip rate to de-spread and recover the test pulse. If the wrong chip rate is used, the de-spread pulse will be distorted. Only the correct chip rate will yield a clean pulse with minimal distortion. Node 1 stores the correct chip rate to de-spread encoded signals from Node 2.

Steps 62 through 72 are repeated with Node 1 as the receiver and Node 2 as the transmitter (step 74).

Once the node pairs have been initialized, the network can be used to covertly communicate information signals through the solid acoustic medium as shown in FIGS. 3a through 3c and 4a and 4b. Without loss of generality, communication will be described for transmission from Node 1 for reception at Node 2 using the above described initialization for each node in the node pair and DSSS coding.

In this embodiment, an information signal 80 having N pulses 82 provides Data In 83 that is split into N parallel processing paths at Node N1 (step 120). Alternately the information signal 80 could be processed serially. Each bit or pulse 82 is delayed via delay 84 to, for example, implement pulse position or amplitude modulation (not shown) (step 122). The signal data rate for the information signal and the spread spectrum rate or "chip rate" are determined by the center frequency $f_{c12}$ and bandwidth $BW_{12}$ of the transmitting pulse and the spreading factor. The signal data rate will increase or decrease with the available bandwidth $BW_{12}$. For DSSS, each pulse 82 is spread e.g. via a multiplier 86 that multiplies each pulse 82 by the pseudo-random code sequence 38 in FIG. 2a according to a PN code for DSSS and the chip rate (step 124). Each of the spread pulses is upconverted to a center frequency $f_{c12}$ via a multiplier 88 that multiples each pulse by a sinewave at frequency $f_{c12}$ to generated modulated pulses 89 (step 126). A pre-distortion filter $1/H_{12}(f)$ 90 (implemented in the time domain) is applied to the upconverted pulses to pre-distort the spread spectrum coded signal in the bandwidth $BW_{12}$ to form a pre-distorted time signal 91 that compensates for the multipath and material and modal dispersion of the solid acoustic medium (step 128). A summing node 92 superimposes the pre-distorted time signals 91 from each channel to form a transmit signal 93 that is applied to the input of a DAC 94 (step 130). Analog signal processing 96 e.g., filtering and/or amplification, is applied to the output of the DAC (step 132). The resulting signal is input to an acoustic transducer 98 (step 134) that transmits the signal into one or more continuous solid paths that make up a solid acoustic medium 100 (step 136).

Receiving Node N2 receives an acoustic signal via acoustic transducer 102 (step 138), applies analog signal processing 104 including low-noise amplification and filter (step 140), and samples the analog signal with an analog-to-digital converter (ADC) 106 (step 142) to generate a received pulse sequence 107. Node N2 downconverts the digital signal using the transmitting nodes center frequency $f_{c12}$ via a multiplier 108 that multiplies each pulse by a sinewave at frequency $f_{c12}$ to generate a demodulated pulse sequence 109 (step 144) and de-spreads using the transmitting nodes unique PN code via a correlator 110 that correlates the pulse sequence with the unique PN code (step 146) to generator data out 112 including the recovered information signal 80.

To monitor channel variation over time, a test sequence 148 can be inserted into a header with some or all encoded information signals or periodically transmitted as the information signal. This test sequence is common to all nodes on the network and is known ahead of time. On reception, each node compares the recovered sequence (after downconversion and de-spreading) to a stored copy of the test sequence. If a discrepancy between the received and stored test sequences exceeds a predetermined threshold, the network re-initializes at least the node pairs that fail (step 150).

Figure 5A:
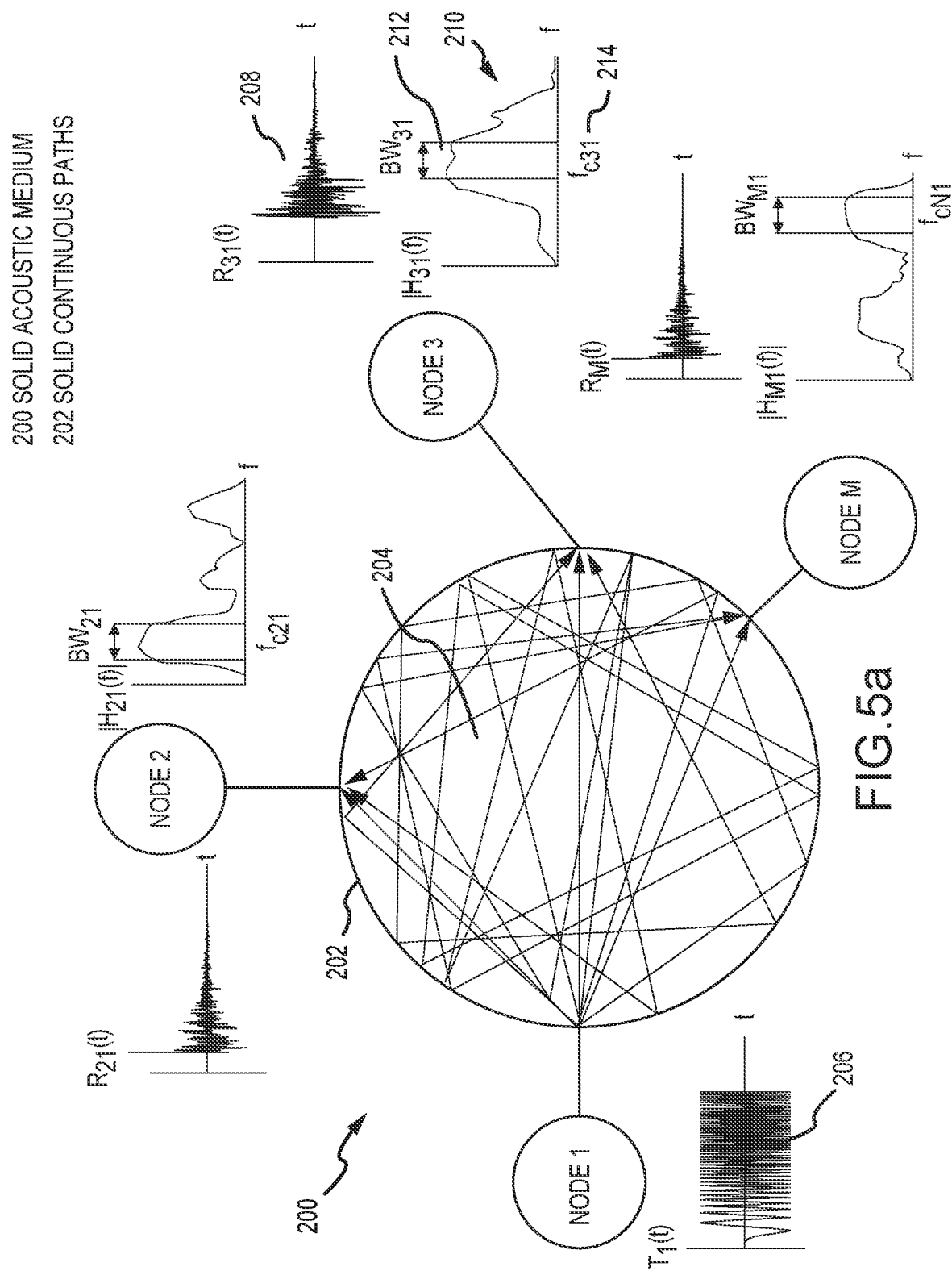
FIGS. 5a through 5c are diagrams for channel sounding and transmit and reception for simultaneous multi-node acoustic communications.
Figure 5B:
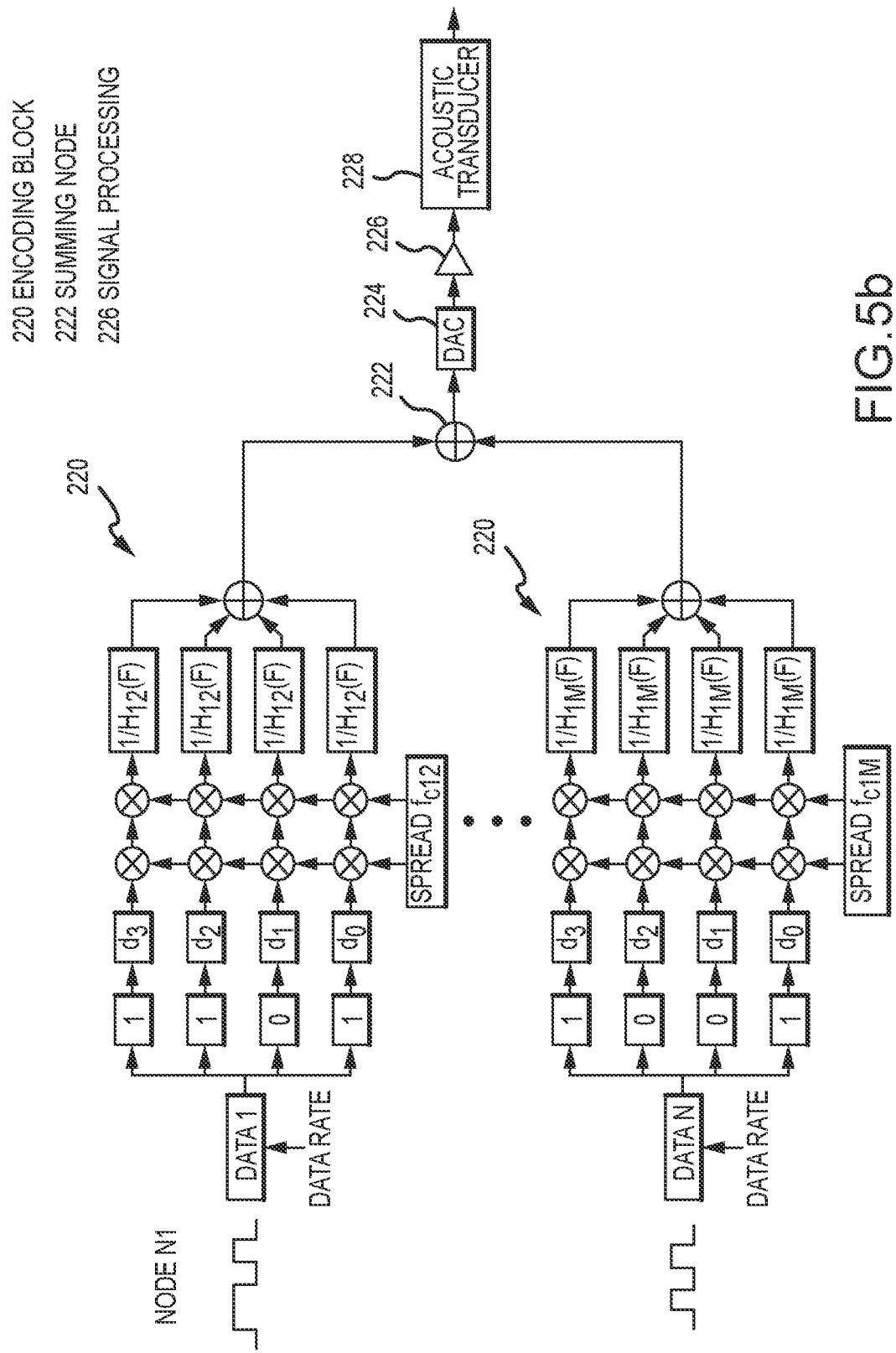
Figure 5C:
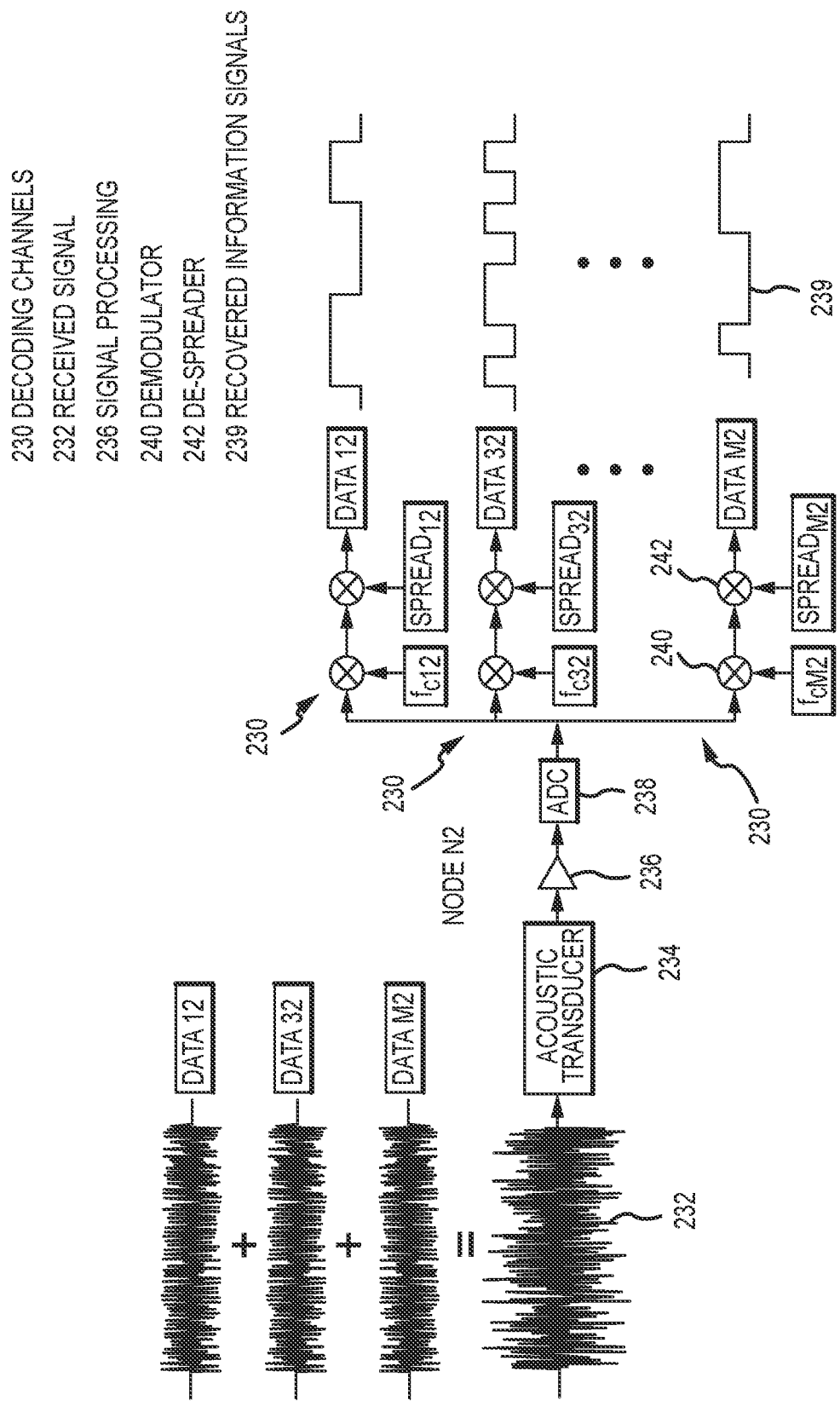

Referring now to FIGS. 5a-5c, a network 200 for simultaneous multi-node communication via a solid acoustic medium 202 including a plurality of continuous solid paths 204. The initialization process is the same as was described for a single node pair except expanded to cover all node pairs. Node 1 transmits a channel sounding pulse 206 onto the solid acoustic medium 202 that travels over the various continuous solid paths 204 to reach each of the nodes N2, N3, ... $N_M$ as time spread signals $R_{21}(t)$, $R_{31}(t)$, ... $R_{M1}(t)$ 208, respectively. Each node determines its channel response $H_{21}(f)$, $H_{31}(f)$, ... $H_{M1}(f)$ 210 and selects its narrow band 212 and center frequency 214 $BW_{21}/f_{c21}$, $BW_{31}/f_{c31}$, ... $BW_{M1}/f_{cM1}$. This is then repeated for each of the nodes transmitting the channel sounding pulse. The nodes then exchange the band and center frequency information to form the node pairs.

As shown in FIG. 5b, Node N1 (and each node) includes M−1 encoding blocks 220 for node N2, N3, .... $N_M$, one for each possible paired node. Each block uses the parameters for the channel for a particular node pair e.g., N1-N2, N1-N3, ... N1-$N_M$. Specifically, the transmitting node's unique spread spectrum code, channel response H(f), selected bandwidth $BW_{NB}$ and center frequency $f_c$, and rate for the information signal. Each block outputs a transmit signal from Node 1 that is uniquely encoded for transmission over the solid acoustic media to the designated node. A summing node 222 sums and superimposes all of the transmit signals, which are then passed through a digital-to-analog converter (DAC) 224, signal processing 226 and an acoustic transducer 228 that couples the transmit signals to the solid acoustic media.

As shown in FIG. 5c, Node N2 (and each node) includes M−1 decoding channels 230 for nodes N1, N3, ... $N_M$, one for each possible paired node. Each channel uses the parameters e.g., the unique spread spectrum code, the bandwidth, the center frequency, etc. from for the transmit node for that node pairing. A time-limited received signal 232 that arrives at Node N2 possibly includes data e.g. DATA 12, DATA 32, ... DATA M2 from all of the other nodes and possibly includes data from other nodes intended for different destination nodes. The received signal passes through an acoustic transducer 234, signal processing 236, an ADC 238 where its split and presented to each channel 230. The combination of both the unique spread spectrum code used by each transmitting node and the unique amplitude and phase characteristics of the channel response H(f) for each node pair allow each channel 230 to simultaneously recover the information signals 239 sent to node N2 from each of the other nodes. Each channel 230 has a demodulator 240 that uses the transmitting node's carrier frequency for Node 2 to demodulate the received signal and a de-spreader 242 that correlates the demodulated signal with the transmitting node's unique spread spectrum code to de-spread and recover the information signal.

Figure 6A:
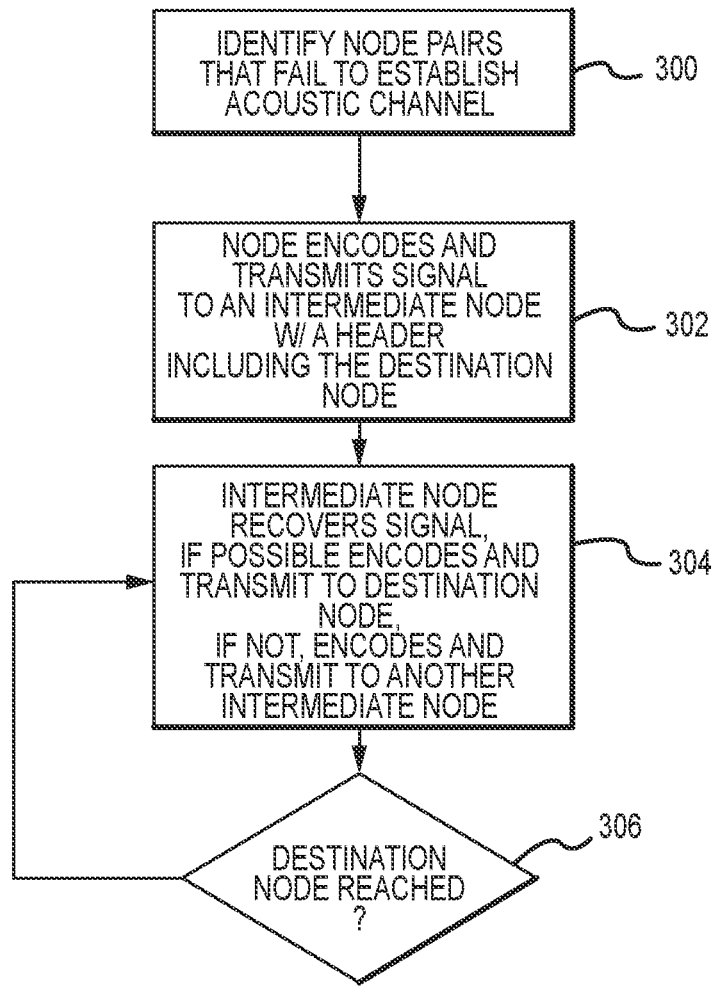
FIGS. 6a and 6b are flow diagrams for alternate embodiments to route information signals through one or more intermediate nodes to reach a destination node.

In large networks in which certain nodes may be separated by a considerable distance or in which direct paths between nodes are highly attenuated, some node pairs may fail to establish a direct communication channel between the two nodes or the direct communication channel may be bandwidth limited or highly attenuated. In such a case, an indirect communication channel including one or more intermediate nodes may be established to connect a node pair. As shown in FIG. 6a, in an embodiment, if a node pair fails to establish a direct channel (step 300), a transmitting node spreads, pre-distorts and transmits the signal to an intermediate node with an instruction to spread, pre-distort and transmit the signal to a destination node (step 302). The intermediate node recovers the signal, and if possible encodes and transmits directly to the destination node, and if not possible encodes and transmit to different intermediate node (step 304). This process repeats (step 306) until the signal reaches the destination node.

Figure 6B:
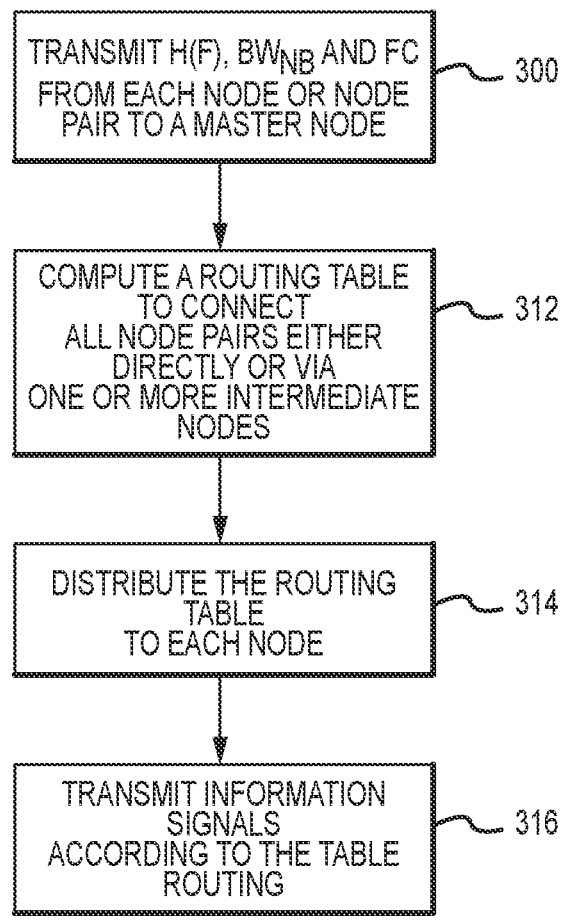

As shown in FIG. 6b, in another embodiment, the channel response H(f), $BW_{NB}$ and $f_c$ for each pair of nodes is transmitted to a master node (step 310). The master node determines a routing table to connect all of the node pairs either directly or through one or more intermediate nodes (step 312) and transmits the routing table to each of the nodes (step 314). The nodes use the routing table to transmit information signals between node pairs (step 316). The master node may, for example, determine the direct or indirect route between nodes that minimizes intersymbol interference (ISI).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of covert acoustic communication from at least node N1 to at least node N2, comprising:
    determining a channel response H(f) having an amplitude and phase from a transmitted and received wideband channel sounding pulse of bandwidth $BW_{WB}$ propagating as elastic waves along a continuous solid path connecting nodes N1 and N2, said channel response H(f) having a global average amplitude response over bandwidth $BW_{WB}$;
    selecting a contiguous narrow frequency bandwidth $BW_{NB} < BW_{WB}$ and center frequency $f_c$ from the channel response H(f) over which a local average amplitude response is greater than the global average amplitude response;
    spreading a narrowband information signal, using a spread spectrum code unique to node N1, to form a spread information signal that occupies bandwidth $BW_{NB}$ at center frequency $f_c$;
    pre-distorting the spread information signal with a pre-distortion filter of 1/H(f) over bandwidth $BW_{NB}$ at center frequency $f_c$ to form a transmit signal; and
    transmitting the transmit signal from node N1 over the continuous solid path to node N2 to covertly communicate the information signal.

2. The method of claim 1, wherein the step of spreading the narrowband information signal comprises:
    given a spreading factor for the spread spectrum code, selecting a rate for the narrowband information signal such that the spread information signal has a bandwidth approximately equal to but not greater than bandwidth $BW_{NB}$;
    spreading the narrowband information signal by the spreading factor, using the spread spectrum code; and
    modulating the spread information signal onto center frequency $f_c$ to place the spread information signal within bandwidth $BW_{NB}$.

3. The method of claim 2, wherein the information signal is recovered at node 2 by:
    demodulating a received time signal with node 1's center frequency $f_c$; and
    de-spreading the demodulated time signal using the spread spectrum code unique to node 1.

4. The method of claim 1, wherein spread spectrum code is selected from a direct-sequence spread spectrum (DSSS), frequency-hopping spread spectrum (FHSS), a time-hopping spread spectrum (THSS) or chirp spread spectrum (CSS) code or combination thereof.

5. The method of claim 1, further comprising:
periodically encoding, pre-distorting and transmitting a test signal known to all nodes;
at node N2, recovering the test signal and comparing the recovered test signal to the known test signal;
if a difference between the recovered test signal and known test signal exceeds a threshold, performing the steps of determining the channel response H(f) and selecting the bandwidth $BW_{NB}$ and center frequency $f_c$ to re-initialize acoustic communications between nodes N1 and N2.

6. The method of claim 1, wherein a plurality of nodes N1, N2, N3, . . . Nm transmit and receive information signals to each other, each pair of nodes determining a channel response H(f) and selecting a bandwidth $BW_{NB}$ and a center frequency $f_c$ for acoustic communication along the continuous solid paths between the nodes.

7. The method of claim 6, wherein if a pair of nodes fails to select the bandwidth $BW_{NB}$ to provide for direct acoustic communication along the continuous solid path between the pair of nodes, the transmitting node spreads, pre-distorts and transmits the information signal intended to an intermediate node with an instruction to spread, pre-distort and transmit to a destination node, and repeats until the information signal reaches the destination node.

8. The method of claim 6, further comprising:
transmitting the channel response H(f), $BW_{NB}$ and $f_c$ for each pair of nodes to a master node;
at said master node determining a routing table to connect all of the node pairs either directly or through one or more intermediate nodes; and
transmitting the routing table to each of the nodes.

9. The method of claim 8, wherein the channel response H(f), $BW_{NB}$ and $f_c$ for each pair of nodes and the routing table are transmitted on a different channel and not along the continuous solid path.

10. The method of claim 6, wherein for each pair of nodes, bandwidth $BW_{NB}$ is selected based on a metric that weights the width of the bandwidth, the local average amplitude over the bandwidth and a variability of the amplitude over the bandwidth.

11. The method of claim 10, wherein bandwidth $BW_{NB}$ is selected by,
finding a peak amplitude in channel response H(f);
growing the bandwidth until the amplitude response falls a predetermined amount from the peak amplitude on either side of the peak; and
if the bandwidth exceeds a threshold, keeping the bandwidth as $BW_{NB}$, and if not finding the next high peak amplitude and growing the bandwidth.

12. The method of claim 6, wherein for each pair of nodes, each node receives the channel sounding pulse from the other node, determines an estimate of its channel response H(f) and its bandwidth $BW_{NB}$ and center frequency $f_c$ from the estimate of the channel response H(f) and exchanges its bandwidth $BW_{NB}$ and center frequency $f_c$ with the other node so that the other node may recover the information signal.

13. The method of claim 12, wherein the pair of nodes exchanges the bandwidth $BW_{NB}$ and center frequency $f_c$ by synthesizing and transmitting a pre-distorted spread spectrum coded pulse using each node's estimate of the channel response H(f), bandwidth $BW_{NB}$ and center frequency $f_c$ and extracting the bandwidth $BW_{NB}$ and center frequency $f_c$ from a received signal.

14. The method of claim 13, wherein the spread spectrum code is direct-sequence spread spectrum (DSSS) in which the coded pulse is synthesized and transmitted at a chip rate for which the bandwidth of the pulse resides within bandwidth $BW_{NB}$, wherein the receiving node extracts the chip rate from the received signal to recover the pulse.

15. The method of claim 14, wherein the chip rate is selected from a set of finite and discrete rates, wherein the receiving node extracts the chip rate until it finds the correct chip rate from the set that yields a clean pulse.

16. The method of claim 12, wherein the bandwidth $BW_{NB}$ and center frequency $f_c$ for each pair of nodes are exchanged on a different channel not along the continuous solid path.

17. The method of claim 1, wherein nodes 1 and 2 comprise computers that ordinarily communicate over a high bandwidth channel, further comprising:
detecting an adversarial penetration of the computer at node 1; and
communicating an information signal of that penetration over the continuous solid path to node 2.

18. A method of covert acoustic communication between a plurality of nodes including at least N1, N2, N3, . . . Nm, comprising:
for each node pair,
determining at each node a channel response H(f) having an amplitude and phase from a transmitted and received wideband channel sounding pulse of bandwidth $BW_{WB}$ propagating as elastic waves along a continuous solid path connecting the node pair, said channel response H(f) having a global average amplitude response over bandwidth $BW_{WB}$;
selecting at each node a contiguous narrow frequency bandwidth $BW_{NB} < BW_{WB}$, center frequency $f_c$ from the channel response H(f) over which a local average amplitude response is greater than the global average amplitude response and a spread spectrum rate; and
exchanging the bandwidth $BW_{NB}$ and center frequency $f_c$ between the pair of nodes,
for each transmitting node of a node pair;
given a spreading factor for a unique spread spectrum code, selecting a rate for a narrowband information signal such that a spread information signal has a bandwidth approximately equal to but not greater than bandwidth $BW_{NB}$;
forming the spread information signal, using the unique spread spectrum code;
modulating the spread information signal onto the transmitting node's center frequency $f_c$ to place the spread information signal within transmitting node's bandwidth $BW_{NB}$;
pre-distorting the spread information signal with a pre-distortion filter of 1/H(f) of the transmitting node over bandwidth BWNB at center frequency $f_c$ of the transmitting node to form a transmit signal; and
transmitting the transmit signal over the continuous solid path,
for each receiving node of a node pair;
demodulating a received time signal with the transmitting node's center frequency $f_c$; and
de-spreading the demodulated time signal using the transmitting node's unique spread spectrum code.

19. A method of covert acoustic communication from at least node N1 to at least node N2, comprising:

determining a channel response H(f) having an amplitude and phase from a transmitted and received wideband channel sounding pulse of bandwidth $BW_{WB}$ propagating as elastic waves along a continuous solid path connecting nodes N1 and N2, said channel response H(f) having a global average amplitude response over bandwidth $BW_{WB}$;

selecting a contiguous narrow frequency bandwidth $BW_{NB} < BW_{WB}$ and center frequency $f_c$ from the channel response H(f) over which a local average amplitude response is greater than the global average amplitude response;

given a spreading factor for a unique direct-sequence spread spectrum (DSSS) code, selecting a rate for an information signal such that a chip rate for a spread information signal has a bandwidth approximately equal to but not greater than bandwidth $BW_{NB}$;

at node N1,
spreading the information signal by the spreading factor, using the unique spread spectrum code, to form the spread information signal;
pre-distorting the spread information signal with a pre-distortion filter of 1/H(f) over bandwidth $BW_{NB}$ at center frequency $f_c$ to form a transmit signal; and
transmitting the transmit signal from node N1 over the continuous solid path to node N2 to covertly communicate the information signal, at node N2,
demodulating a received time signal with center frequency $f_c$; and
de-spreading the demodulated time signal using the spread spectrum code and chip rate unique to node 1.

* * * * *

UNITED STATES PATENT AND TRADEMARK OFFICE
CERTIFICATE OF CORRECTION

PATENT NO. : 11,108,429 B1  
APPLICATION NO. : 16/889302  
DATED : August 31, 2021  
INVENTOR(S) : Crouch et al.

It is certified that error appears in the above-identified patent and that said Letters Patent is hereby corrected as shown below:

In the Drawings

Sheet 8 of 13, Fig. 4b, reference numeral 109, Line 1, delete "SEQUEENCE" and insert --SEQUENCE-- therefor In the Specification In Column 3, Line 22, delete "G." and insert --$f_c$.-- therefor In Column 4, Line 54, delete "airs." and insert --pairs.-- therefor In Column 6, Line 14, delete "18" and insert --20-- therefor In Column 6, Line 41, delete "G" and insert --$f_c$-- therefor In Column 7, Line 42, delete "band" and insert --bandwidth-- therefor In the Claims In Column 12, Line 59, in Claim 18, delete "BWNB" and insert --$BW_{NB}$-- therefor In Column 14, Line 12, in Claim 19, delete "signal," and insert --signal;-- therefor Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*